United States Patent [19]

Goswami

[11] 4,241,192

[45] Dec. 23, 1980

[54] PROCESS FOR MAKING CELLULAR POLYVINYL CHLORIDE PRODUCTS AND PRODUCTS THEREOF

[75] Inventor: Jagadish C. Goswami, New City, N.Y.

[73] Assignee: Stauffer Chemical Company, Westport, Conn.

[21] Appl. No.: 884,781

[22] Filed: Mar. 8, 1978

Related U.S. Application Data

[63] Continuation of Ser. No. 785,983, Apr. 8, 1977, abandoned, which is a continuation of Ser. No. 598,522, Jul. 25, 1975, abandoned.

[51] Int. Cl.$^3$ .................................................. C08J 9/10
[52] U.S. Cl. ............................... 521/73; 264/DIG. 5; 521/94; 521/95; 521/96; 521/909
[58] Field of Search ...................... 521/73, 94, 95, 96, 521/909; 264/DIG. 5

[56] References Cited

U.S. PATENT DOCUMENTS

| | | | |
|---|---|---|---|
| 3,819,783 | 6/1974 | Jones | 521/73 |
| 3,983,294 | 9/1976 | Goswami | 521/145 |
| 4,031,045 | 6/1977 | Goswami | 521/97 |
| 4,097,663 | 6/1978 | Gallagher et al. | 521/73 |

*Primary Examiner*—Morton Foelak
*Attorney, Agent, or Firm*—Richard P. Fennelly

[57] ABSTRACT

Cellular polyvinyl chloride products of good cell quality are made utilizing a lower fusion temperature than conventionally employed by incorporating in a polyvinyl chloride containing plastisol, which has a fusion temperature of from about 220° F. to about 300° F., an effective amount of a blowing agent selected from the group consisting of (1) a mixture of benzene sulfonyl hydrazide and 4,4'-oxybis (benzene sulfonyl hydrazide), (2) a mixture of toluene sulfonyl hydrazide and 4,4'-oxybis (benzene sulfonyl hydrazide), and (3) 4,4'-oxybis (benzene sulfonyl hydrazide) alone, and an organic base or oxidizing agent which acts as an activator for said blowing agent.

22 Claims, No Drawings

PROCESS FOR MAKING CELLULAR POLYVINYL CHLORIDE PRODUCTS AND PRODUCTS THEREOF

This is a continuation application of U.S. application Ser. No. 785,983, filed Apr. 8, 1977, now abandoned, which in turn was a continuation of U.S. application Ser. No. 598,522, filed July 25, 1975, also now abandoned.

TECHNICAL DESCRIPTION OF THE INVENTION

Cellular polyvinyl chloride products find use as gasketing and weather stripping materials. When placed on a suitable backing, they can be used in such products as carpets, vinyl tiles, draperies, and the like. These products are conventionally formed by heating a plastisol composition containing a blowing agent so as to decompose the blowing agent with the release of gas therefrom. This release of gas as the blowing agent is decomposed expands the plastisol composition to form the polyvinyl chloride foam product.

Many blowing agent activator systems known to the prior art require expansion temperatures that are in the neighborhood of 320° F. to 420° F. (160° C.–216° C.). Such high temperatures, when a non-backed products are desired, require high energy costs. When a backed product is desired, the temperatures cause an additional problem since they are dangerously close to or exceed the degradation temperature of some of the materials which are used to form the substrate or backing for the desired product. For example, polypropylene fibers used in carpets degrade at about 290° F. to 300° F. (143° C.–149° C.). Although it is possible to activate some blowing agents, e.g., azodicarbonamide, so that they decompose at lower temperatures, it has been found that their expansion capabilities are very poor as judged by an examination of the cellular structure after the foaming operation has been performed. For such systems, a higher temperature range of 320° F.–420° F. (160° C.–216° C.) is needed, if a fine foam structure is desired. Use of these higher temperatures can, as noted above, be a detriment to any heat sensitive materials that might be present, e.g., synthetic carpet material. Hence, a need exists, particularly when a backed product is desired, for a blowing agent system which can be used at lower temperatures and which produces a fine quality foam.

Although there are some blowing agents which decompose at a relatively low temperature of about 200°–260° F. (93°–127° C.), without activation, they are generally not suitable for expanding a polyvinyl chloride composition since they produce a high density foam, with formation of either toxic gases or a toxic residue, a malodorous residue, or discoloration of the resulting foam. For example, both benzene sulfonyl hydrazide and toluene sulfonyl hydrazide when used alone, produce high density, malodorous foams.

The present invention is an improved process for forming a cellular polyvinyl chloride product, and the product thereof, which comprises the use of a novel and unobvious low temperature blowing agent-activator system. The use of this process allows a person of ordinary skill in the art to foam a cellular polyvinyl chloride at generally lower temperatures than conventionally possible without the formation of toxic or malodorous products, without discoloration of the product resulting from the process, and, when a backed product is desired, without loss of the physical and aesthetic properties of any heat sensitive materials adhering to the backing.

It has been found that polyvinyl chloride backed products of superior cell quality can be formed by use of an effective amount, e.g., from about 0.5% to about 20% by weight, preferably from about 3% to about 15%, based on the weight of the plastisol composition, of a blowing agent-activator system which comprises either (1) a mixture of benzene sulfonyl hydrazide and 4,4'-oxybis (benzene sulfonyl hydrazide), (2) a mixture of toluene sulfonyl hydrazide and 4,4'-oxybis (benzene sulfonyl hydrazide), or (3) 4,4'-oxybis (benzene sulfonyl hydrazide) alone, and an organic base or oxidizing agent activator for said blowing agents. If either of the aforementioned mixtures of blowing agents are used, the amount of 4,4'-oxybis (benzene sulfonyl hydrazide) in said mixture should be at least 30%, by weight, of said mixture.

A polyvinyl copolymer having a fusion temperature of from about 200° F. to about 300° F. (about 93° C. to about 149° C.) is used in the plastisol composition described above. The terminology "fusion temperature" as used herein is meant to indicate that temperature at which all of the resin particles become dissolved in the plasticizers that are present so that such a composition, when cooled from said fusion temperature, produces a homogeneous solid. The use of the copolymer having the above described fusion temperature allows for fusion and expansion of the plastisol containing said copolymer in a temperature range of about 200° F. (93° C.) to about 300° F. (149° C.) with the formation of cells of good quality.

The basic plastisol composition in which the blowing agent system of this invention is to be used is one which is a foamable plastisol composition, i.e., a fluid dispersion of particulate vinyl resin in a plasticizer, which is capable of being converted into a solid foamed product by the application of heat and which contains a copolymer having a fusion temperature in the range described above. The preferred thermoplastic resins which are used in the plastisol are the copolymers of vinyl chloride, such as those copolymers obtained by copolymerizing vinyl chloride with a minor amount of one or more copolymerizable monomers, such as vinyl acetate, vinylidene chloride, diethyl maleate and bis (beta-chloroethyl) vinylphosphonate. The vinyl chloride content in the copolymers should be between about 75% and 85% of the copolymer resin and the relative viscosity (as measured by a 1%, by weight, solution of the copolymer in cyclohexanone at 25° C.) should range from about 1.7 to 2.7 in order to obtain the proper fusion temperature. The particle size of the copolymer can be adjusted by regulating the emulsion polymerization reaction according to techniques known in the art so that the above described relative viscosity values are met. A particularly preferred copolymer is one which comprises from about 75% to about 85%, by weight, vinyl chloride, from about 7% to about 13%, vinyl acetate, and from about 7% to about 13% of a bis(hydrocarbyl) vinylphosphonate of the formula

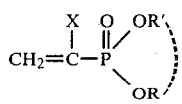

where X is selected from the group consisting of hydrogen, halogen, cyano, aryl and $C_1$–$C_{18}$ alkyl. R and R' are hydrocarbyl groups obtained by removing a hydrogen from an aliphatic or aromatic group. Preferred groups for R and R' are the substituted and unsubstituted $C_1$–$C_{12}$ alkyl groups, particularly the halosubstituted $C_1$–$C_8$ alkyl groups. A particularly preferred vinylphosphonate is bis (beta-chloroethyl) vinylphosphonate.

The copolymers useful in practicing the present invention are formed using conventional emulsion polymerization procedures which can be used to formulate vinyl chloride containing polymers. In preparing these copolymers, the selected monomers are dispersed in an aqueous medium containing from about 0.03 to 10%, by weight of the monomers, of one or more anionic, nonionic or cationic emulsifiers, for example, the alkyl carboxylic acid salts, the alkyl sufate salts, alkyl sulfosuccinate salts, the alkyl aryl ether alcohols and the alkyl aryl polyether sulfate salts. The aqueous monomer emulsion is then heated for about 5 to 24 hours, e.g., at a temperature of from about 30° C. to about 75° C., in the presence of from about 0.05 to 5% by weight of the monomer mixture, of a water soluble, free radical initiating catalyst, for example, ammonium, sodium or potassium persulfate, hydrogen peroxide or a redox system comprising a mixture of a persulfate with an alkali metal bisulfite, thiosulfate or hydrosulfite.

The plastisol composition described above should also contain about 25% to about 70%, by weight, based on the total weight of the plastisol of any of the well known plasticizers for vinyl chloride. Included within this class are: dialkyl adipate esters, dialkyl azelates, the compatible glycol dibenzoate esters, the compatible epoxy derivatives including epoxidized tall oil and the compatible epoxy resins, glycollates such as butyl phthalyl butyl glycollate, mellitates such as the trialkyl trimellitates, the compatible phenoxy compounds, phosphate esters including triaryl, trialkyl and alkyl-aryl combinations, derivatives of orthophthalic acid, such as the dialkyl and alkyl benzyl o-phthalates, polyesters of various dibasic acids with glycols, such as adipic, azelaic and phthalic acids with various glycols terminating with a monofunctional compound, the compatible pentaerythritol derivatives and the compatible sulfonamides. A more complete listing of potential plasticizer candidates is found in *Modern Plastics Encylcopedia*, Vol. 51, No. 10A, pages 775–785 (1974).

The blowing agent used in the plastisol is selected from the group consisting of (1) a mixture of benzene sulfonyl hydrazide (available commercially as "Celogen BSH," the preferred material, "Genitron BSH" or "Porofor BSH"), and 4,4'-oxybis (benzene sulfonyl hydrazide), which is commercially available as "Celogen OT," the preferred material, "Genitron OB" or "Porofor DO-44," (2) a mixture of toluene sulfonyl hydrazide (available commercially: "Celogen TSH") and 4,4'-oxybis (benzene sulfonyl hydrazide), and (3) 4,4'-oxybis (benzene sulfonyl hydrazide) alone. When the mixtures described above are used, the amount of 4,4'-oxybis (benzene sulfonyl hydrazide) should be at least 30%, by weight, of said mixture. Preferably, an equimolar amount of either benzene sulfonyl hydrazide or toluene sulfonyl hydrazide, as a first component, is used with an equimolar amount of the oxybis compound as a second component. The presence of the latter compound avoids the odor problems normally associated with use of either of the first two enumerated blowing agents alone.

Approximately about 50% to about 95%, by weight, preferably about 65% to about 85%, by weight, of the blowing agent-activator system is comprised of one of the above-described blowing agents. The remainder comprises an organic base or oxidizing agent-activator component. The activator will therefore comprise about 0.5% to about 10% by weight of the plastisol.

The organic base can be any of the non-volatile monoalkyl, dialkyl or trialkyl diamines or the dialkyl triamines including triethylene diamine, the preferred amine, ethylene diamine, ethylene triamine, propylene diamine and hexamethylene diamine. The non-volatile monoalkyl, dialkyl and trialkyl monoamines can also be used. If desired, either urea or alkyl substituted ureas can be used as one of the non-volatile organic base activators. The alkyl group or groups in any of the foregoing amines is preferably a $C_2$–$C_{14}$ alkyl group.

The preferred oxidizing agent-activator can be a non-volatile diaryl or dialkyl peroxide, such as benzoyl peroxide, the preferred activator, lauroyl peroxide, di-t-butyl peroxide and diacetyl peroxide. The alkyl group is preferably $C_1$–$C_{12}$ and the aryl group is phenyl.

The polyvinyl chloride composition comprising the vinyl chloride copolymer resin, plasticizer, blowing agent, accelerator and, if desired, fillers, antioxidants, pigments and any other optional ingredients, are thoroughly mixed, e.g., in a Hobart mixer or in a three roll paintmill, to form a plastisol which can either then be coated onto a selected substrate or can be left as such. Either of these structures is then subjected to a temperature of from about 200° F. to about 300° F., preferably about 250° F. (121° C.) to about 280° F. (138° C.), for about 5 to about 20 minutes to quickly foam the plastisol into a foam of superior quality.

The present invention is illustrated with the following Examples:

EXAMPLE 1

This example illustrates the formation of a vinyl chloridevinyl acetate-bis (beta chloroethyl) vinylphosphonate emulsion copolymer suitable for use in practicing the present invention. The procedure utilizes a sequence of polymerization steps. The monomer weight ratio in all steps is 80 parts vinyl chloride, 11 parts vinyl acetate and 9 parts bis (beta chloroethyl) vinylphosphonate.

A portion of a deionized water charge of 38.5 lbs. was used to dissolve 38.3 g of the bis (tridecyl) ester of sodium sulfosuccinic acid (sold as Aerosol-TR, American Cyanamid Co.), 19.5 g of potassium persulfate, and 7.3 g of sodium bicarbonate. The remainder of the water was added and the mixture was charged into the reactor. To this mixture was added 1 lb. 7¼ oz. of bis (beta chloroethyl) vinylphosphonate and 1 lb. 12½ oz. of vinyl acetate. The reactor was closed, and the mixture was stirred briefly. The agitation was stopped and the reactor was evacuted three times with the vacuum being broken with vinyl chloride monomer. After the third evacuation, 12 lbs. 14 oz. of vinyl chloride monomer was charged into the mixture. The agitator was turned on, and the mixture was heated to 51° C. The reactor was held at this temperature for about six hours until a 40 lb./in² drop in pressure from the levels noted at the beginning of the reaction occurred. At this point, the reactor was vented and allowed to cool. The aqueous emulsion had a solids content of about 27% of the desired copolymer product which is called product "A."

A 7 lb. 2½ oz. portion of the product from the proceding step was used as a seed in another similar aqueous emulsion polymerization. The amounts of reagents used in this step are:

| | |
|---|---|
| Vinyl Acetate | 1 lb. 8½ oz. |
| Vinyl Chloride | 11 lb. 3½ oz. |
| Bis (beta chloroethyl) vinylphosphonate | 1 lb. 4 oz. |
| Deionized Water | 31 lb. 15½ oz. |
| Aerosol TR-70 | 14.6 g. |
| Potassium persulfate | 14.6 g. |
| MaHCO₃ | 7.3 g. |

The product from this step, called product "B," is a larger particle than was produced in the first polymerization step.

A similar portion of product "B" was used as a seed in another polymerization similar to the second polymerization set forth above. The aqueous emulsion which resulted therefrom contained Product "C."

A 3 lb. 9¼ oz. portion of product A and a 3 lb. 9¼ oz. portion of product C were used as a seed in a final polymerization procedure. The same reagents used in the second polymerization step above were again employed. The product from this step was used in Example 2.

EXAMPLE 2

A low fusion polyvinyl chloride resin composition was formed by admixing 100 parts by weight of the copolymer of Example 1, 100 parts by weight of a plasticizer composite comprising 80% butyl benzyl phthalate and 20% HB-40, a partially hydrogenated terphenyl plasticizer sold by Monsanto, 40 parts by weight of calcium carbonate filler, and 8 parts by weight of benzoyl peroxide paste. To this composition was added varying amounts of benzene sulfonyl hydrazide (Celogen BSH) and 4,4'-oxybis (benzene sulfonyl hydrazide) (Celogen OT). The compositions were expanded by heating to 260° F. (127° C.) for 10 minutes. The Table sets forth the results that were obtained:

TABLE I

| | AMOUNTS (%) OF REAGENTS | | | |
|---|---|---|---|---|
| FORMU-LATION | CELOGEN BSH | CELOGEN OT | PER-OXIDE PASTE | FOAM DENSITY (lbs/ft³) |
| 1 | 5 | — | 3.33 | 25.6* |
| 2 | 3.33 | 1.67 | 3.33 | 25.7 |
| 3 | 2.5 | 2.5 | 3.33 | 25.4 |
| 4 | 1.67 | 3.33 | 3.33 | 25.6 |
| 5 | — | 5 | 3.33 | 31.1 |

All concentrations are expressed as weight % based on the weight of polyvinyl chloride copolymer, plasticizer composition and CaCO₃ filler.
*Malodorous foam.

When Celogen BSH was used at 5% with no peroxide paste and no Celogen OT, the malodorous foam had an unacceptable density of 55.8 lbs/ft³. Use of Celogen OT alone with no peroxide paste yielded a composition which did not foam.

EXAMPLE 3

A foamable polyvinyl chloride composition was fabricated by admixing 100 parts by weight of the copolymer of Example 1, 100 parts of a plasticizer composite which comprised 70 parts by weight butyl benzyl phthalate, 30 parts dioctyl phthalate and 10 parts of a secondary plasticizer (Escoflex 175, sold by East Coast Chemicals Co.), 40 parts by weight of CaCO₃ filler, and varying amounts of different blowing agents. The composition also contained varying amounts of different amines for acceleration. The Table given below sets forth the results. In all cases the total concentration of blowing agent was 3.2%, based on the weight of polyvinyl chloride copolymer, CaCO₃ filler, and plasticizer composite.

TABLE II

| | AMOUNT (% BY WEIGHT) | | |
|---|---|---|---|
| FORMU-LATION NO. | BLOWING AGENT(S) | AMINE ACCELERATOR | FOAM DENSITY (LBS/FT³) |
| 1 | BSH : 1.6<br>OT : 1.6 | TEDA : 1.6 | 20.5 |
| 2 | BSH : 1.6<br>OT : 1.6 | TEDA : 0.8 | 22.9 |
| 3 | BSH : 1.6<br>OT : 1.6 | TEDA : 0.4 | 26.2 |
| 4 | BSH : 1.6<br>OT : 1.6 | Dabco : 0.8 | 23.3 |
| 5* | BSH : 1.6<br>AZ : 1.6 | TEDA : 0.8 | 32.0 |
| 6* | OT : 1.6<br>AZ : 1.6 | TEDA : 0.8 | 38.2 |
| 7* | BSH : 1.6<br>OT : 1.6 | NEM : 0.8 | 46.0** |
| 8* | AZ : 3.2 | TEDA : 0.8 | 52.8** |

All amounts are % by weight based on the weight of PVC copolymer, CaCO₃ and plasticizer.
Abbreviations: BSH = benzene sulfonyl hydrazide (Celogen BSH); OT = 4,4'-oxybis (benzene sulfonyl hydrazide) Celogen OT; NEM = N-ethyl morpholine; Dabco = Dabco R-8020, sold by Air Products and Chemicals, Inc. (triethylenediamine dissolved in alkanolamine).
The compositions set forth above were expanded by heating to 260° F. (127° C.) for 10 min.
*for comparison. Not part of the present invention.
**Poor expansion was noted.

Use of 0.8% TEDA with 3.2% OT and 0.8% TEDA with 3.2% BSH, respectively, in two separate foams gave densities of 19.6 and 25 lbs/ft³, respectively.

EXAMPLE 4

A urea activated foam was formed by the same procedure described in Example 2. The following reagents were used:

| REAGENT | AMOUNT (in grams) |
|---|---|
| Vinyl chloride/vinyl acetate/ bis (beta-chloroethyl) vinyl phosphonate copolymer (85/10/5 pbw)* | 100 |
| Butyl benzyl phthalate | 75 |
| CaCO₃ filler | 30 |
| Plasticizer (Sanitizer 213) | 35 |
| 4,4'-oxybis (benzene sulfonyl hydrazide) | 8 |
| Urea | 4 |
| TiO₂ | 2 |
| ABC-2** | 2 |

*formed by a similar procedure to that shown in Example 1.
**A proprietary liquid zinc stabilizer for polyvinyl chloride, sold by Advance Division, Carlisle Chemical Works, Inc., New Brunswick, N.J.

The foregoing illustrates certain preferred embodiments of the claimed invention. The scope of protection sought is set forth in the claims which follow.

What is claimed:

1. In a process for making a cellular vinyl chloride polymer product by heating a foamable vinyl chloride polymer-containing plastisol, wherein the improvement comprises incorporating in the plastisol, which has a fusion and expansion temperature of about 200° F. to 300° F., vinyl chloride copolymer of vinyl chloride, vinyl acetate, and a bis(hydrocarbyl)vinylphosphonate, an effective amount for foaming of a blowing agent selected from the group consisting of a mixture of benzene sulfonyl hydrazide and 4,4'-oxybis (benzene sulfonyl hydrazide), a mixture of toluene sulfonyl hydrazide and 4,4'-oxybis (benzene sulfonyl hydrazide), and 4,4'-oxybis (benzene sulfonyl hydrazide) alone, and an effective amount of non-volatile organic base or oxidizing agent activator for said blowing agent, said activator being selected from the group consisting of urea, the $C_2$–$C_{14}$ alkyl substituted ureas, the $C_2$–$C_{14}$ monoalkyl, dialkyl and trialkyl monoamines, the $C_2$–$C_{12}$ dialkyl or trialkyl diamines, the $C_2$–$C_{14}$ dialkyl triamines, and the diaryl and $C_1$–$C_{12}$ dialkyl peroxides.

2. A process as claimed in claim 1 wherein the amount of blowing agent ranges from about 0.5% to about 20% by weight of the plastisol.

3. A process as claimed in claim 1 wherein the amount of blowing agent ranges from about 3% to about 15% by weight of the plastisol.

4. A process as claimed in claim 1 wherein the activator is selected from the group consisting of triethylenediamine, ethylene diamine, ethylene triamine, propylene diamine and hexamethylene diamine.

5. A process as claimed in claim 1 wherein the activator is selected from the group consisting of benzoyl peroxide, lauroyl peroxide, di-t-butyl peroxide and diacetyl peroxide.

6. A process as claimed in claim 1 wherein the plastisol is heated to a temperature of about 200° F. to about 300° F.

7. A process as claimed in claim 1 wherein the plastisol contains about 25% to about 70% by weight of a plasticizer.

8. A process as claimed in claim 1 wherein the activator comprises about 0.5% to about 10% by weight of the plastisol.

9. A process as claimed in claim 1 wherein the blowing agent is present in an amount of from about 50% to 95% by weight of the amount of blowing agent and activator.

10. A process as claimed in claim 1 wherein the plastisol comprises a copolymer of from about 75% to about 85%, by weight, vinyl chloride, from about 7% to about 13% vinyl acetate, and from about 7% to about 13% bis (beta-chloroethyl) vinylphosphonate.

11. A process as claimed in claim 1 wherein a substrate is coated with the foamable plastisol and the plastisol is thereafter heated.

12. A vinyl chloride polymer-containing plastisol composition having a fusion and expansion temperature of from about 200° F. to 300° F. which comprises a vinyl chloride copolymer of vinyl chloride, vinyl acetate, and a bis(hydrocarbyl)vinylphosphonate, an effective amount for foaming of a blowing agent selected from the group consisting of a mixture of benzene sulfonyl hydrazide and 4,4'-oxybis (benzene sulfonyl hydrazide), a mixture of toluene sulfonyl hydrazide and 4,4'-oxybis (benzene sulfonyl hydrazide), and 4,4'-oxybis (benzene sulfonyl hydrazide) alone, and an effective amount of a nonvolatile organic base or oxidizing agent activator for said blowing agent, said activator being selected from the group consisting of urea, the $C_2$–$C_{14}$ alkyl substituted ureas, the $C_2$–$C_{14}$ monoalkyl, dialkyl and trialkyl monoamines, the $C_2$–$C_{14}$ dialkyl or trialkyl diamines, the $C_2$–$C_{14}$ dialkyl triamines, and the diaryl and $C_1$–$C_{12}$ dialkyl peroxides.

13. A composition as claimed in claim 12 wherein the amount of blowing agent ranges from about 0.5% to about 20% by weight of the plastisol.

14. A composition as claimed in claim 12 wherein the amount of blowing agent ranges from about 3% to about 15% by weight of the plastisol.

15. A composition as claimed in claim 12 wherein the activator is selected from the group consisting of triethylenediamine, ethylene diamine, ethylene triamine, propylene diamine and hexamethylene diamine.

16. A composition as claimed in claim 12 wherein the activator is selected from the group consisting of benzoyl peroxide, lauroyl peroxide, di-t-butyl peroxide and diacetyl peroxide.

17. A composition as claimed in claim 12 wherein the plastisol contains about 25% to about 70% by weight of a plasticizer.

18. A composition as claimed in claim 12 wherein the accelerator comprises about 0.5% to about 10% by weight of the plastisol.

19. A composition as claimed in claim 12 wherein the plastisol comprises a copolymer of from about 75% to about 85%, by weight, vinyl chloride, from about 7% to about 13% vinyl acetate and from about 7% to about 13% bis (beta-chloroethyl) vinylphosphonate.

20. A composition as claimed in claim 12 wherein the blowing agent is present at from about 50% to about 95% by weight of the amount of blowing agent and activator.

21. The product resulting from the process of claim 1.

22. The product resulting from the process of claim 11.

* * * * *

UNITED STATES PATENT AND TRADEMARK OFFICE
CERTIFICATE OF CORRECTION

PATENT NO. : 4,241,192
DATED : December 23, 1980
INVENTOR(S) : Jagadish C. Goswami It is certified that error appears in the above-identified patent and that said Letters Patent are hereby corrected as shown below:

Abstract, line 5, "220°F." should be -- 200°F. --;

Col. 1, line 27, "products" should be -- product --;

Col. 5, lines 7-8, "proceding" should be -- preceding --;

Col. 5, line 19, "MaHCO$_3$" in the Table should be -- NaHCO$_3$ --;

and

Col. 6, line 5, "100" should be -- 110 --.

Signed and Sealed this

Twelfth Day of May 1981

[SEAL]

Attest:

RENE D. TEGTMEYER

Attesting Officer     Acting Commissioner of Patents and Trademarks